United States Patent [19]

Ptasinski

[11] Patent Number: 5,035,115
[45] Date of Patent: Jul. 30, 1991

[54] ENERGY CONSERVING ENGINE

[76] Inventor: Stanley Ptasinski, 160 Holdman Ave., Sierra Madre, Calif. 91024

[21] Appl. No.: 459,989

[22] Filed: Jan. 2, 1990

[51] Int. Cl.⁵ ............................................... F01B 29/04
[52] U.S. Cl. ........................................ 60/712; 60/514
[58] Field of Search ................................. 60/712, 514

[56] References Cited

U.S. PATENT DOCUMENTS

| | | | |
|---|---|---|---|
| 2,671,311 | 3/1954 | Rohrbach | 60/712 X |
| 4,322,950 | 4/1982 | Jepsen | 60/712 |
| 4,402,182 | 9/1983 | Miller | 60/712 |
| 4,706,462 | 11/1987 | Soltermack | 60/712 |

FOREIGN PATENT DOCUMENTS 261084 11/1926 United Kingdom ................... 60/712

Primary Examiner—Allen M. Ostrager
Attorney, Agent, or Firm—James T. English

[57] ABSTRACT

An energy conserving engine particularly for heavy power requirements in freight movers and power plants, consists of an Otto cycle Diesel engine modified to receive superheated water injection for steam operation. The waste energy resulting from heat due to fossil fuel combustion is utilized in a series of counterflow heat exchangers that are temperature and pressure monitored, and valved for computer control of the heat transfer rates, providing superheated water at the proper temperature and pressure for steam operation of the engine. The computer defaults to fossil fuel operation of the engine when superheated water and steam operation conditions do not exist in the counterflow heat exchangers.

7 Claims, 4 Drawing Sheets

ENERGY CONSERVING ENGINE

BACKGROUND OF THE INVENTION

The conservation of heat that is a by-product of the combustion of fossil fuels in an Otto type engine such as a Diesel or Gasoline Engine, and the reduction of emissions from these engines, as well as the reapplication of the waste heat energy to make the engine more efficient in terms of fuel consumption, has long been a goal of the automotive industry. In general, combustion in a cylinder takes place with greatest efficiency when the temperature is extremely high and the fuel is under extremely high pressure in the cylinder. A diesel engine makes use of these principles and is able to eliminate the need for using a spark for ignition (although a glow plug is used in some engines for starting).

The cylinder temperature needs to be at a safe level to prevent deterioration of the lubricating oil of the engine; therefore, a system that can maintain the lubricating oil at an optimum temperature level, while conducting off the heat resulting from the combustion of fuel, and reapplying the exhaust heat energy to enhance engine performance in terms of fuel efficiency and pollution reduction would adapt the engine to future needs.

Prior art approaches for reducing fuel consumption and reducing pollutants included novel mechanisms for transferring heat from the exhaust manifold to superheat water for injection into the cylinder of the same fossil fuel engine to enhance the power stroke of the pistons. A practical hybrid fossil fuel and steam engine does not exist in the prior art because there was not facile method or means for switching modes at the desired times to take advantage of the unique characteristics of each mode.

The prior art implementations are based on the following principles:

1. Water, when heated under pressure conditions, can attain superheat temperatures far in excess of 212° F. (100° C.) without boiling; If such superheated water is released into an atmosphere having less pressure than that under which such water has been brought to a superheat, it will flash into superheated steam, producing harnessable power.

2. Water at a given pressure, when heated to a certain temperature flashes into steam. A compressor into which superheated water is injected and compressed and raised to a critical temperature will cause the water to flash into steam producing force on the compressor piston when the critical temperature is reached. The amount of the force depends on the cubic inch displacement of the compressor, among other factors.

3. An internal combustion engine at the moment of firing, would invariably produce enough heat and pressure to flash into steam, any water contained in the cylinder.

4. Water when flashed into steam expands to approximately 1,600 times its orignal volume, exerting about 2000 psi force on a piston in a cylinder of an engine.

A combination of these principles is used with a fossil fuel engine, of the Otto cycle type, as a source of heating for circulating fluids in a combined mode of operation wherein fossil fuel and water are consumed sequentially in at least one of the cylinders of the engine.

The prior art shows the use of superheated water injection systems for increasing the efficiency of a gasoline engine by supplemental water injection; some embodiments show use of the exhaust manifold as a source of heat for elevating water to the superheated level for reapplication to one or more of the cylinders of the same engine. However, the prior art does not show two distinct modes of operation, steam and fossil fuel, nor does it take into account the precise management of temperatures and pressures required of various parts and functions of the engine at specific times in the operation from startup to shutdown and re-start of the engine. The prior art does not show a fully automatic hybrid fossil fuel-and-superheated water injection engine.

BRIEF DESCRIPTION OF THE INVENTION

An approach for both conserving heat energy of the internal combustion engine, as well as reducing the pollution inherent in fossil fuel consumption, in accordance with the present invention, is based on counterflow heat exchangers wherein all heating and cooling functions for the engine are derived from fluid in the tanks of heat exchangers in series. The central coil of the heat exchangers are in series and are connected to the exhaust ports of each cylinder of the engine.

In accordance with the present invention, a segmented one or a series of counterflow heat exchangers and associated valves controlled by programmed microprocessor, can maintain the proper conditions of engine cooling and heat conservation whereby the combination of fossil fuel operation and steam operation can take place in the same engine, to optimize the use of the fossil fuel so as to gain maximum benefit from minimal fuel consumption, and to minimize the emission of pollutants into the atmosphere.

Accordingly, an Otto cycle engine such as a Diesel engine can be modified essentially by the addition of a series of valved counterflow heat exchangers and water injectors that operate to:

1. Direct heat from the exhaust port of each cylinder of the engine by conduction of the exhaust heat into the central coil of each heat exchanger in series, forming an exhaust path for the cylinders of the engine, and terminating in a reservoir tank water scrubber for removing particulates and pollutants in the exhaust of fossil fuel burned in the engine.

Each heat exchanger segment has a counterflow reservoir tank that is isolated sufficiently from the other heat exchanger segments and valved to maintain a pressure and a temperature of 470 degrees Fahrenheit whereby superheated water is obtained for injection into at least one cylinder of the engine, for steam operation of the engine, and water at a lower temperature (180 degrees F.) is obtained for the water jacket.

2. Accumulate heat in the first counterflow heat exchanger tank until the counterflow water temperature is the desired maximum operating temperature for the steam operation function of the engine, and valve the superheated water to a water injector.

3. Accumulate heat in a second counterflow heat exchanger to store heat that is in excess of the desired waterjacket temperature and Valve the counterflow to obtain the maximum cooling temperature for the water jacket of the engine.

4. Accumulate excess heat in a third counterflow heat exchanger for counterflow through the series of counterflow heat exchangers.

In order to maintain the desired temperatures for the superheated water injection and the cooling functions for the fossil fuel function of the engine, the counterflow rates of the CHEs are required to be constantly monitored and altered to maintain the proper temperature conditions. This is done by monitoring and continuously computing the proper counterflow rates for valving the CHEs to attain the stable conditions required for the specific mode of operation of the engine at any given time. Changeover from one mode of operation, either steam or fossil fuel, to the other, is accomplished automatically by the computer, based on the presence of proper operating temperatures and pressures. For startup conditions in the steam mode, electric heaters are provided in the cylinders to bring the injected water up to superheated temperatures.

It should be noted that space is provided in each tank to accommodate counterflow differentials and that mixtures such as water and ethylene glycol would normally be used. Such mixtures can raise the boiling point of the combined solution far above 212° F.; for example a 60% solution can have a boiling point in excess of 260° F. However, the mixture has a lower heat conducting capacity than water alone, therefore, the rate of flow of the mixture in a counterflow heat exchanger must be slower to maintain a particular heat transfer rate.

DETAILED DESCRIPTION OF THE PREFERRED EMBODIMENTS

Figure 1:
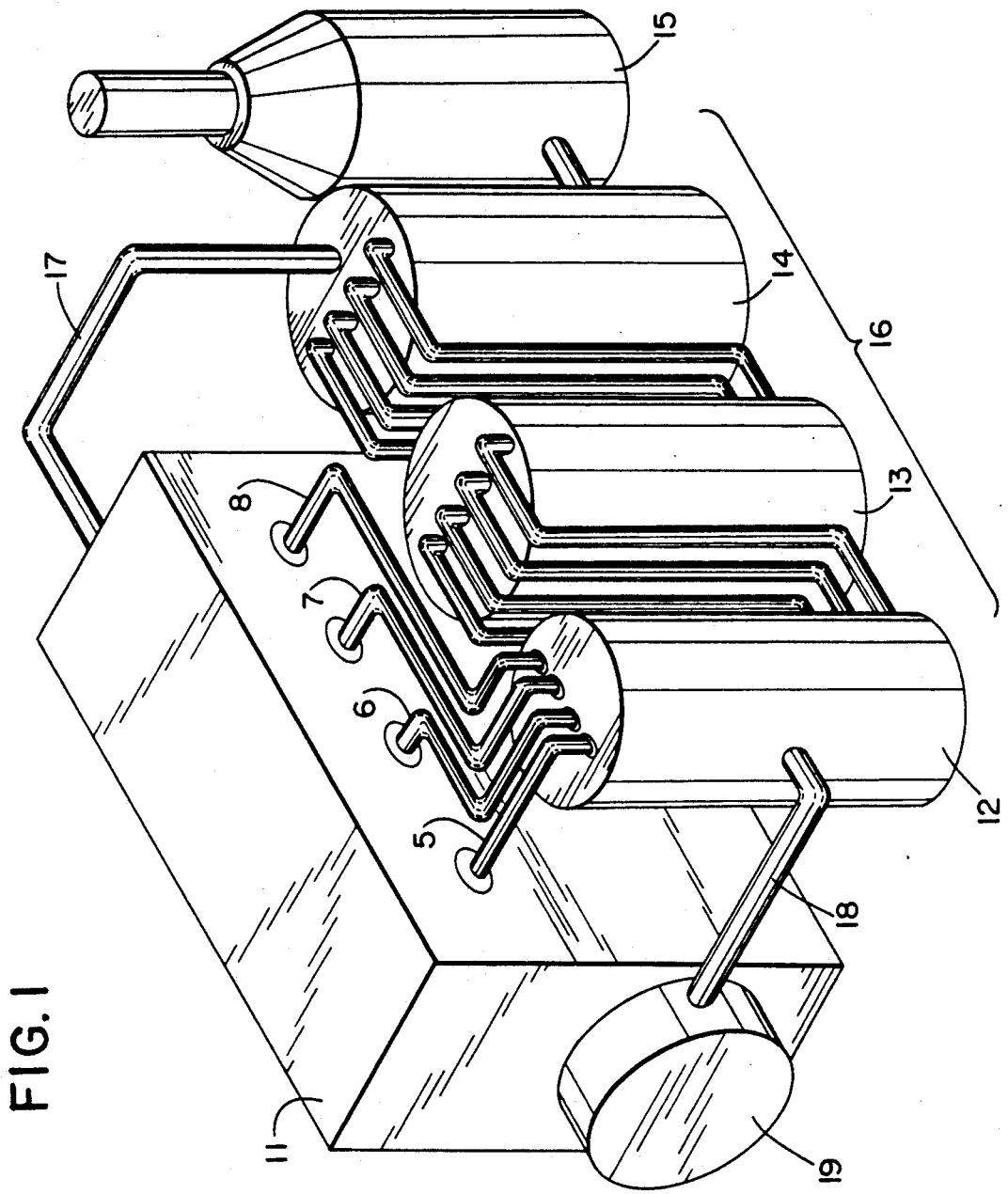
FIG. 1 is an elevation of the essential elements of the engine illustrating the method of transfer of heat from the exhaust ports of the engine through the segmented heat exchanger.

Reference is directed to FIG. 1 which shows the essential elements of the invention in elevation. In this embodiment the engine 11 is a four-cylinder Diesel type Otto cycle engine, in which the exhaust from each of four cylinders is brought out by conduits 5, 6, 7 and 8 to a three segment counterflow heat exchanger 16 consisting of superheated temperature segment 12, high temperature segment 13, and medium temperature segment 14, followed by the low temperature supply tank 15, which additionally serves as an exhaust scrubber and muffler in the fossil fuel mode of operation of the engine. The medium temperature segment 14 of the segmented counterflow heat exchanger 16 is tapped by conduit 17 for cooling the water jacket of the engine 11 such that the cylinder temperature and lubricating oil temperature is maintained at safe levels. The high temperature segment 12 is maintained at a superheated water temperature for injection through conduit 18 into each cylinder of the engine at the proper time as determined by the crankshaft timing mechanism 19 to be described with reference to FIG. 4. The high temperature segment 12 is maintained at a temperature of about 470 degrees Fahrenheit by controlling the pressure and counterflow rate by computer operated valve means.

The temperatures and pressures in segments 13 and 14 are similarly controlled by computer-actuated valves. This will be described with reference to FIG. 2. The engine exhaust at approximately 650 degrees Fahrenheit is piped to central coils in the heat exchanger segment 12. This exhaust flows freely through the three segments of the heat exchanger 16 and through the supply tank 15. The piping layout of the three segments is designed to confine both conductive and radiative heat due to the engine exhaust to conserve the heat energy for heating the water. The CHEs are environmentally highly insulated.

Figure 2:
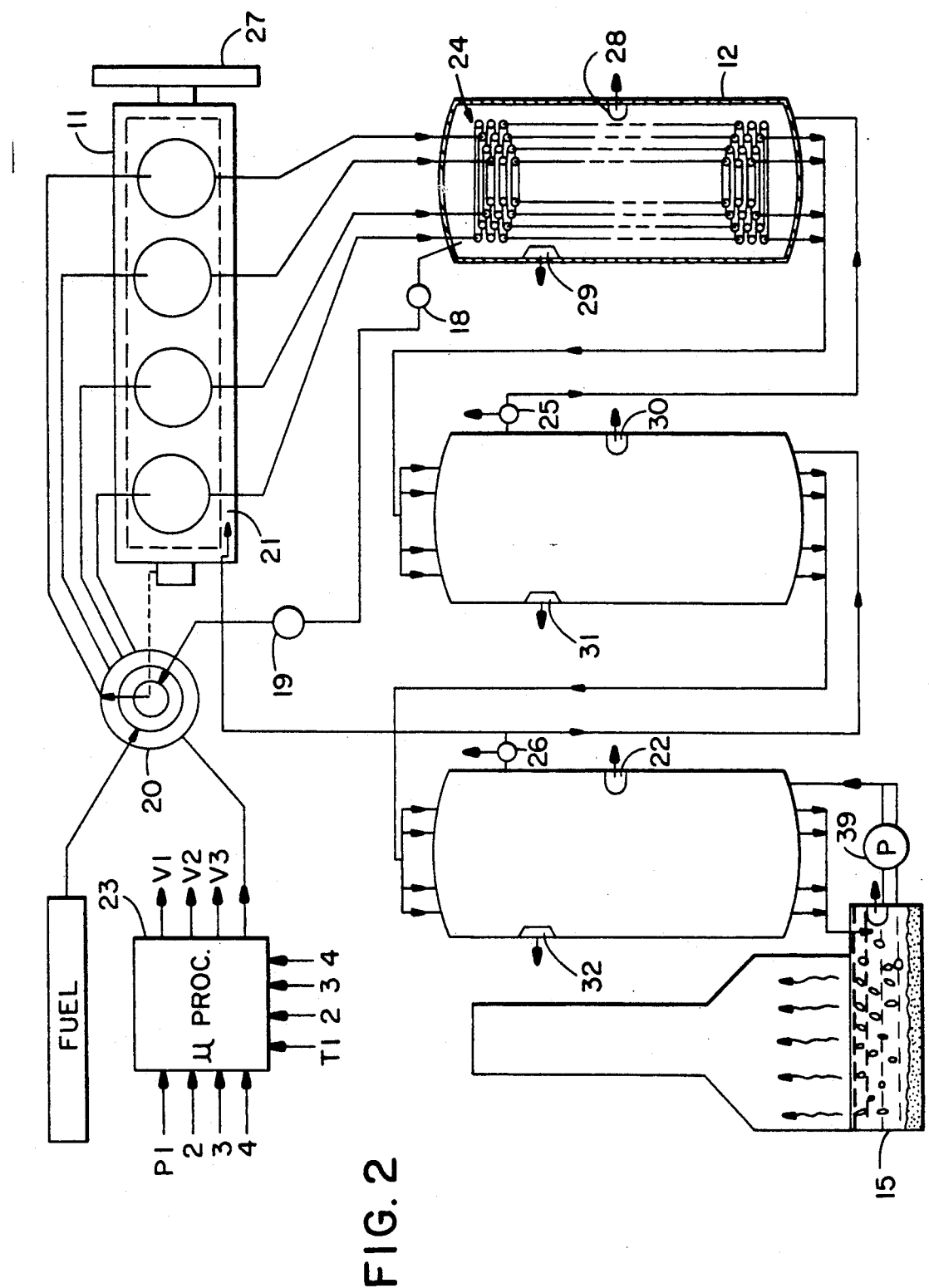
FIG. 2 is a functional flow diagram of the engine showing the essential temperature control elements for maintaining the operating conditions and environment.

Referring now to the functional flow diagram, FIG. 2, we see the engine 11 of the Otto type, which utilizes a water jacket 21 surrounding the cylinders in which fossil fuel such as diesel fuel or oil vapor is compressed and exploded. In the case of a Diesel configuration, no ignition system is required for the run mode. The water jacket provides coolant circulation mainly to keep the piston/cylinder-wall lubrication from breaking down. It is necessary to maintain the optimum temperature of the lubricating oil by circulating coolant in the jacket 21. Coolants such as water or mixtures of water and ethylene glycol can assure a high boiling point of this circulating fluid. The temperature of the circulating fluid in this jacket 21 is monitored by an electrical thermometer temperature sensor 22 having an output connected to the I/O circuitry of the microprocessor 23 which monitors all temperatures involved in the operation of the engine and controls the flow rates of the circulating fluids through electrically operated valves and pumps to be described later in relation to specific functions involved in the conservation and utilization of heat derived from the combustion of the fossil fuel.

Fluid; i.e., steam or fossil fuel exhaust, from the exhaust ports is circulated through the coil 24 of the CHE 12 where it is retained by a valve 25 until the temperature of the fluid in the CHE 12 attains optimum operating temperature, for example 470 degrees F. At that temperature, the valve 26 is opened up by the computer 23 to allow flow of fluid from the reservoir 15, through the water jacket 21 to maintain that temperature in the optimum operating range.

The fluid in the CHE 12 tank becomes superheated above 212 degrees to about 470 degrees F. and is injected through valve 18 and pressure sensor 19 and injector 20 to the cylinders of the Diesel engine 11 where it explodes at the proper instant against the cylinder piston. Superheated steam at a temperature of 650 degrees in the cylinder 21 results when superheated water is injected at a timed rate to explode at an instant when the intracylinder pressure is lower than the tank pressure of the CHE 12 such that the water injected into the cylinder will flash into superheated steam producing a force of about 2000 psi on the piston. Thus, the engine 11 acts as a steam engine producing rotation of the flywheel 27 and delivering horsepower to a load connected thereto. This load can be a generator for producing electrical power or a source of torque for moving large loads.

It should be noted that the temperatures and pressures are monitored by the computer 23 such that the proper conditions are maintained in the counterflow heat exchanger segments 12, 13, and 14. For example, temperature sensor 28 and pressure sensor 29 indications are used to control the counterflow through the valve 25; similarly, temperature sensor 30 and pressure sensor 31 are used to control the flow through valve 26.

Temperature sensor 22 and pressure sensor 32 are used to determine the flow from the storage tank 15. The control functions of the microprocessor computer 23 are valve proportional open-and-close digital signals to valves 18, 25, and 26 and mode selection electrical pulses to the fuel injector 20.

Figure 3:
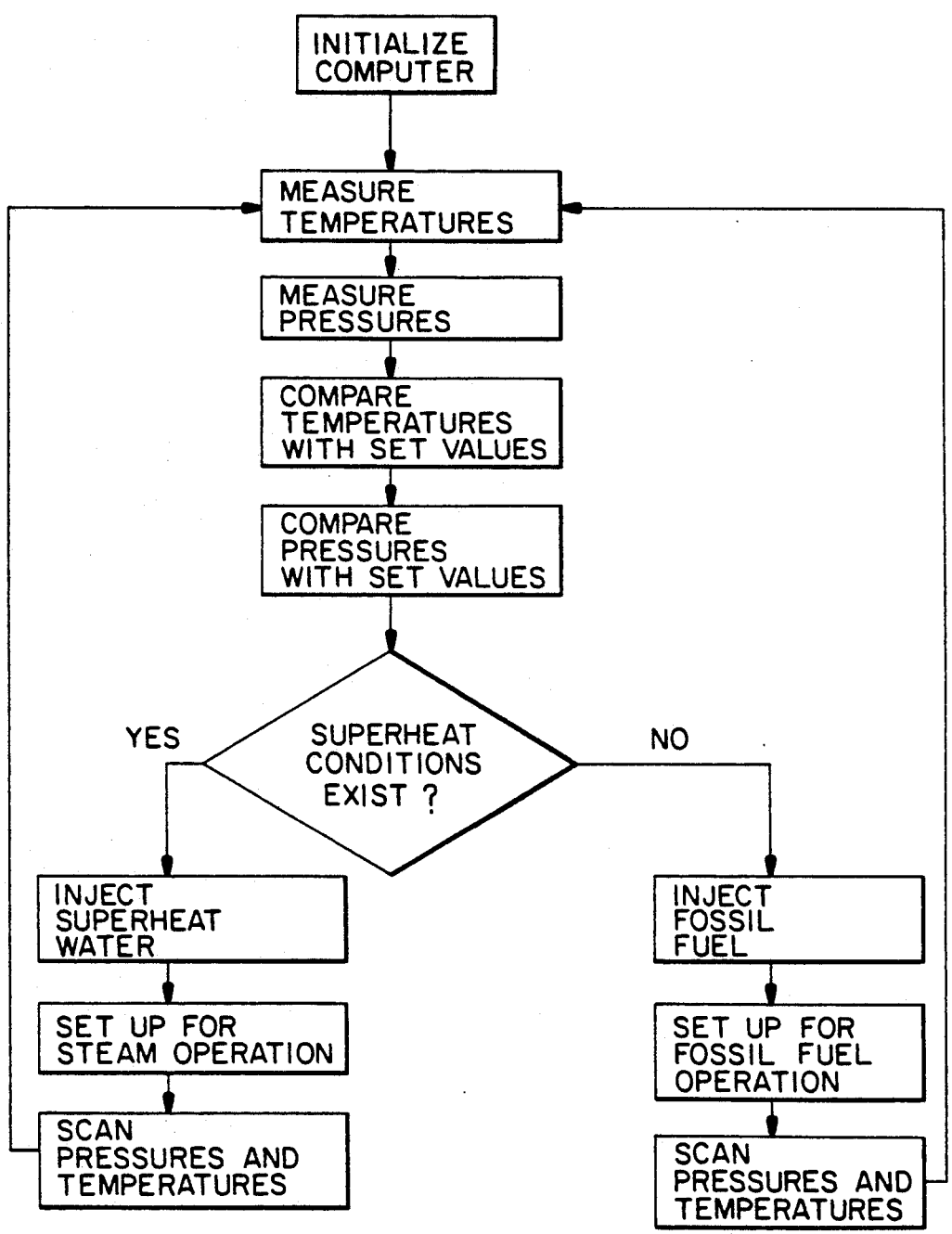
FIG. 3 is a flow diagram of the microprocessor program to maintain the proper temperature conditions in the various heat exchangers and the engine operating mode switching.

Referring now to the computer program flow diagram, FIG. 3, when the engine is started, the computer checks its memory capabilities and initial values as well as its Read Only Memory where standard operating values are stored. It then reads the current values of pressures and temperatures of the heat exchangers and compares these with the standard values for operation in the specific mode of operation of the engine.

The engine will normally start in the fossil fuel mode until the superheated water temperature and pressure conditions are met as defined by the standard values stored in the Read Only Memory. If the standard values of temperature and pressure are met, the computer makes the decision to convert to the steam opearting mode and actuates the fuel injector to provide superheated water to the fuel injector system and shut down the fossil fuel mode of operation. The engine then runs in the steam mode continuously and the pressure and temperature conditions are updated periodically indicating that conditions for steam mode operation are normal. If conditions are not normal at any update sequence, the computer sets up fossil fuel injection and ancillary conditions for fossil fuel mode operation. Updating continues in this mode until superheat conditions prevail, and the mode change is again made by the computer to operate in the steam mode.

Figure 4:
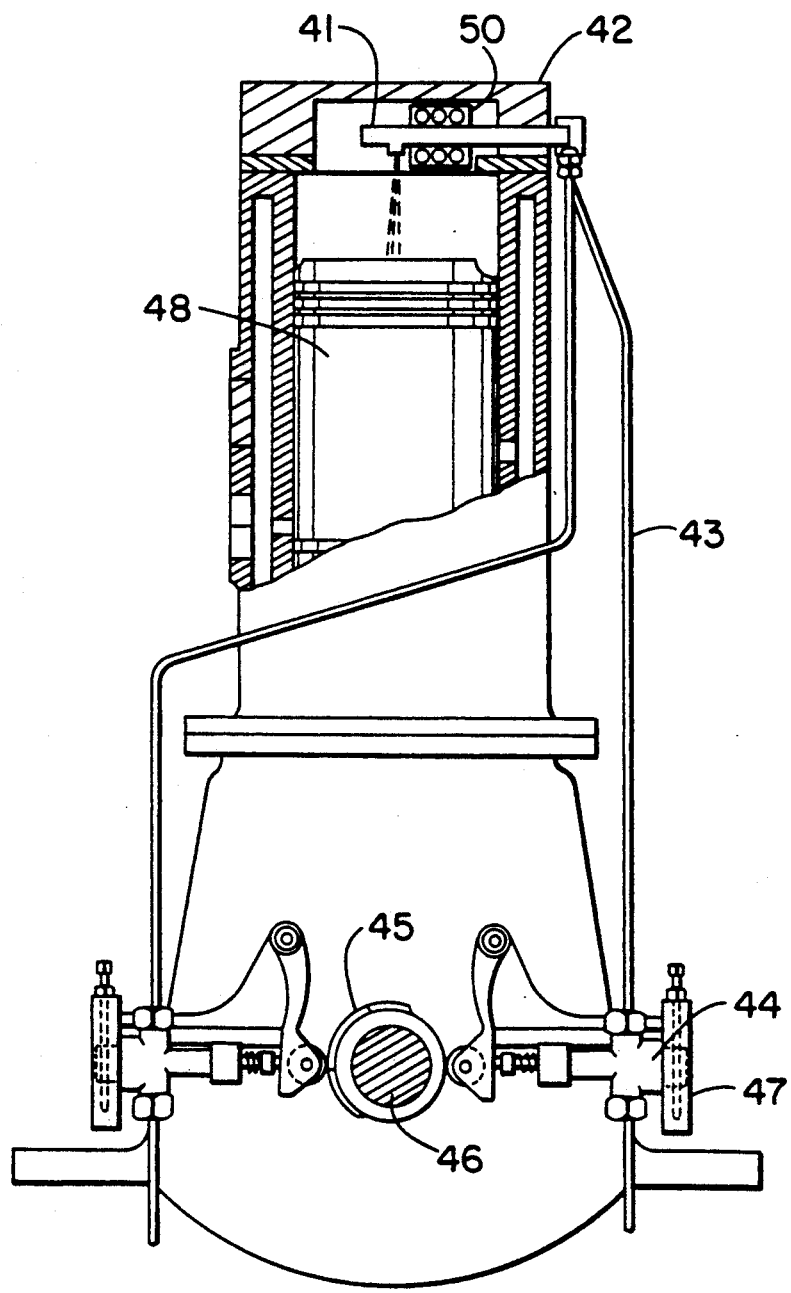
FIG. 4 is a drawing of a cross section through a cylinder, and a partial elevation of the crankcase showing the timing of the water injection into the cylinder in relation to the crankshaft position and cycle. It also shows the superheated water injector and heater.

Referring now to FIG. 4, we see one possible embodiment of the means for injecting the superheated water into the cylinder for steam mode operation. The water injection tube 41 is shown in the cylinder head 42 and is fed by a line 43 from a valve 44 which is actuated by the position of the cam 45 on the crankshaft 46. The counter 47 counts the cycles of the crankshaft 46 and opens a port in the valve 44 such that the cam 45 opens the valve 44 only on the proper cycle of the crankshaft 46, or stroke of the piston 48. When the valve 44 is open, superheated water at the proper pressure flows through the tube 43 through the water injection tube 41 and against the piston 48 where it explodes into steam, forcing the piston downward and imparting a torque to the crankshaft. To heat the water in the injector tube, an electric heater 50 is positioned surrounding injector tube 41 to initiate the startup of the steam mode of operation. It will be recognized that a valve such as 44 actuated by a cam and cam follower such as that shown for valve 44 is needed for each cylinder of the engine as is the associated line 43, injector tube 41, and heater 50. The tubes such as 43 receive the superheated water from the fuel injector 20, FIG. 2, which is in turn actuated by the computer 23.

The electric heater 50 in each cylinder provides a temperature of approximately 1400 degrees F. The piston movement produces a temperature of about 800 degrees due to compression heat. The average temperature is (1400+800)/2=1100 degrees. With an initial cylinder head temperature of 1100 degrees and an injected 470 degrees of the superheated water the average cylinder temperature becomes 785 degrees. As the piston reaches the height of the compression stroke, in the steam mode, and starts downward, the compressed air and the cylinder temperature is approximately 785 degrees F., and the superheated water is injected at high pressure and at a temperature of approximately 470 degrees F. The superheated water explodes in the cylinder, due to the higher temperature and the reduced pressure, producing force on the piston of about 2000 psi. As the piston moves downward, there is decompression—the temperature goes progressively lower —so that an average of approximately 650 degrees exists in the cylinder. This is the exhaust temperature. This exhaust gas flows through the central coil of the counterflow heat exchanger which is composed of three segments isolated by valves to produce and maintain optimum operating temperatures for the steam mode of operation of the engine and proper water jacket temperature for the fossil fuel mode of operation.

As the water temperature is reduced to 180 degrees in the counterflow heat exchanger, from an initial 650 degree exhaust temperature, it is pumped back to the counterflow tank 14 at 180 degree temperature by an electric pump 39, FIG. 2. The counterflow picks up heat from 180 to 300 degrees in tank 13 and then from 300 to 470 in tank 12.

In the steam or the fossil fuel mode, a 1000 HP engine in accordance with the invention will generate about 700 kilowatts electrical energy by conversion using a d.c. generator connected to the crankshaft. Part of this power must be used for system service which includes the pump 39 which conmsumes about 5 kilowatts (900 pounds pressure and 5 gallons per minute), and the electrical heaters in each cylinder. Approximately 100 kilowatts is provided for this system service, leaving 600 kilowatts available for distribution as electrical energy if the engine is to be used for power generation, or 26,500,000 foot-pounds per minute for driving a mechanical load.

Thus has been described a heat energy conserving engine based on utilizing the otherwise waste heat of a fossil fueled Diesel engine such as might be used in a power station or in the transportation of large loads by rail or by truck, to efficiently utilize the fossil fuel and produce less pollutant emissions into the atmosphere, while making the engine more automatic in operation by placing all functions under computer control.

What is claimed is:

1. An Otto cycle engine utilizing fossil fuels, having a coolant waterjacket surrounding a plurality of internal combustion cylinders having exhaust ports and containing reciprocally moving pistons connected to a crankshaft, which comprises:

a reservoir storing liquid at ambient temperature;

a counterflow heat exchanger having at least one conduit located centrally in a tank, the conduit in fluid communication with said exhaust port of one of said cylinders of said engine, the tank containing liquid in conductive heat transfer contact with the conduit, the tank being in fluid communication with said reservoir, the tank adapted to flow fluid in a direction opposite to the fluid flow in the centrally located conduit;

temperature sensing means in the tank of said counterflow heat exchanger, monitoring the temperature of the fluid in the tank;

pressure sensing means in the tank of said counterflow heat exchanger, monitoring the pressure in the tank;

a first valve means in fluid communication with the tank adapted to vary the flow rate of fluid in the tank;

a second counterflow heat exchanger having a conduit located centrally in a tank, said conduit in fluid communication with at least one of said plurality of cylinders of said engine, and said tank containing fluid in conductive heat transfer contact with said conduit, said tank in fluid communication with said reservoir.

temperature sensing means in the tank of said second counterflow heat exchanger, monitoring the temperature of fluid in said tank;

pressure sensing means in the tank of said second counterflow heat exchanger, monitoring the pressure in the tank;

a second valve means in communication with the tank in said heat exchanger, adapted to adjust flow rate of fluid in the tank;

a third valve means in communication with the tank of said first counterflow heat exchanger, adapted to initiate and terminate the flow of superheated water from said first counterflow heat exchanger tank, to said engine;

injector means in at least one of said cylinders of said engine, adapted to inject superheated water from said third valve means into said cylinder;

a fourth valve means in communication with said second counterflow heat exchanger, adapted to vary the flow of water from said second counterflow heat exchanger to said waterjacket of said engine for maintaining operating temperature of said engine;

a third counterflow heat exchanger having a conduit located centrally in a tank, in fluid communication with said second counterflow heat exchanger conduit, and in communication with the tank of said second counterflow heat exchanger at one end, the tank being in fluid communication with said reservoir at the opposite end, the tank containing fluid in conductive heat transfer contact with the conduit;

controller means connected to said four valve means, said temperature sensor means and to said pressure sensor means for computing the flows of counterflow fluids in said tanks and said injector means to obtain steam operating mode temperatures;

whereby the superheated water temperature and pressure conditions in the plurality of counterflow heat exchangers is used to compute the amount of flow through the valves for producing superheated water for injection into the cylinders to initiate steam mode operation from fossil fuel mode and return, whenever the proper temperature and pressure conditions exist for mode conversion.

2. An engine as described in claim 1 further comprising:

a generator connected to the crankshaft of said engine for generating electrical output for heater power;

an electric heater located in at least one cylinder of said engine, adapted to heat said injector means producing superheated water for exploding in the cylinder, said heater receiving electrical power from said generator;

a water pump electrically connected to said generator electrical output, adapted to pump water in said first, second, and third counterflow heat exchangers in the counterflow direction;

whereby the counterflow water is superheated in the cylinders of said engine by the heaters and the steam mode of operation of said engine is self sustaining over periods of time without fossil fuel heat, and with no air pollution emission.

3. An engine as described in claim 1 wherein said controller means is a microprocessor computer in which standard operating temperatures, pressures, valve positions and mode conversion functions are recorded in a Read Only Memory for comparison with current values thereof for computing counterflow rates and valve actuations to achieve steam operating conditions in lieu of the default fossil fuel operating conditions.

4. An engine as described in claim 1 wherein said reservoir is a scrubber for fossil fuel exhaust gas for removing smoke and particulates.

5. An engine as described in claim 1 wherein said reservoir includes: a scrubber wherein fossil fuel exhaust flows through water in said reservoir such that particulates such as smoke are washed from the gaseous exhaust to precipitate out of the water; and a catalytic converter for filtering and reducing fossil fuel exhaust oxides of Nitrogen air pollutants.

6. An engine as described in claim 1 wherein said first, second, third and fourth valve means are digital numerically operated proportional closure valves.

7. An engine as described in claim 1 wherein said liquid in said first, second and third heat exchangers and said reservoir is a solution of water and ethylene glycol used as fuel in the steam mode of operation of said engine.

* * * * *